US008839248B2

(12) United States Patent  
Kuperstein et al.

(10) Patent No.: US 8,839,248 B2
(45) Date of Patent: Sep. 16, 2014

(54) SYNTHESIS OF MEMORY BARRIERS

(75) Inventors: Michael Kuperstein, New York, NY (US); Martin Vechev, Yorktown Heights, NY (US); Eran Yahav, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 12/789,726

(22) Filed: May 28, 2010

(65) Prior Publication Data

US 2011/0296424 A1 Dec. 1, 2011

(51) Int. Cl.
*G06F 9/46* (2006.01)
*G06F 9/52* (2006.01)
(52) U.S. Cl.
CPC ...................................... *G06F 9/52* (2013.01)
USPC ............ 718/100; 718/102; 717/155; 717/156
(58) Field of Classification Search
None
See application file for complete search history.

(56) References Cited

U.S. PATENT DOCUMENTS

| | | | | |
|---|---|---|---|---|
| 5,615,137 | A | * | 3/1997 | Holzmann et al. ............... 703/17 |
| 6,295,515 | B1 | * | 9/2001 | Kurshan et al. .................. 703/13 |
| 2011/0078692 | A1 | * | 3/2011 | Nickolls et al. ............... 718/103 |
| 2011/0252075 | A1 | * | 10/2011 | Ylonen et al. ................. 707/818 |

OTHER PUBLICATIONS

Xing Fang, Jaejin Lee, Samuel P. Midkiff; Automatic Fence Insertion for Shared Memory Multiprocessing; ICS Jun. 23-26, 2003.*
Susann C. Allmaier, Graham Horton; Parallel Shared—Memory State-Space exploration in Stochastic Modeling; Irregular '97 Proceedings of the 4th International Symposium on Solving Irregularly Structured Problems in Parallel; p. 207-218.*
Sebastian Burckhardt, Rajeev Alur, Milo M. K. Martin; CheckFence: Checking Consistency of Concurrent Data Types on Relaxed Memory Model; PLDI'07 (Jun. 11-13, 2007) ACM 2007.*

* cited by examiner

*Primary Examiner* — Emerson Puente
*Assistant Examiner* — Dong Kim
(74) *Attorney, Agent, or Firm* — Ryan, Mason & Lewis, LLP

(57) ABSTRACT

A framework is provided for automatic inference of memory fences in concurrent programs. A method is provided for generating a set of ordering constraints that prevent executions of a program violating a specification. One or more incoming avoidable transitions are identified for a state and one or more ordering constraints are refined for the state. The set of ordering constraints are generated by taking a conjunction of ordering constraints for all states that violate the specification. One or more fence locations can optionally be selected based on the generated set of ordering constraints.

14 Claims, 7 Drawing Sheets

```
1  typedef struct {
2    long  size;
3    int   *ap;
4  } item_t;
5
6  long top , bottom;
7  item_t *wsq;
```

```
1  void push(int task) {
2    long  b = bottom;
3    long  t = top;
4    item_t*  q = wsq;
5    if (b-t ≥ q→size -1){
6      q = expand ();
7      s = q→size;
8    }
9    q→ap[b % wsq→size]=task;
       fence("store-store");
10   bottom = b + 1;
11 }
```

```
1  int take() {
2    long  b = bottom - 1;
3    item_t*  q = wsq;
4    bottom = b;
       fence("store-load");
5    long t = top;
6    if (b < t) {
7      bottom = 1;
8      return EMPTY;
9    }
10   task = q→ap[b % q→size];
11   if (b > t)
12     return task;
13   if (!CAS(&top , t , t+1))
14     return EMPTY;
15   bottom = t + 1;
16   return task;
17 }
```

```
1  int steal() {
2    long t = top;
       fence("load-load");
3    long b = bottom;
       fence("load-load");
4    item_t*  q = wsq;
5    if (t ≥ b)
6      return EMPTY;
7    task=q→ap[t % q→size];
       fence("load-store");
8    if (!CAS(&top , t , t+1))
9      return ABORT;
10   return task;
11 }
```

```
1  item_t* expand() {
2    int   newsize = wsq→size * 2;
3    int*  newitems = (int *) malloc(newsize*sizeof(int));
4    item_t *newq = (item_t *)malloc(sizeof(item_t);
5    for (long i = top; i < bottom; i++) {
6      newitems[i % newsize] = wsq→ap[i % wsq→size];
7    }
8    newq→size = newsize;
9    newq→ap = newitems;
       fence("store-store");
10   wsq = newq;
11   return newq;
12 }
```

FIG. 2

| # | LOCATIONS | EFFECT OF REORDER | NEEDED FENCE |
|---|---|---|---|
| 1 | PUSH:9:10 | STEAL () RETURNS PHANTOM ITEM | STORE-STORE |
| 2 | TAKE:4:5 | LOST ITEMS | STORE-LOAD |
| 3 | STEAL:2:3 | LOST ITEMS | LOAD-LOAD |
| 4 | STEAL:3:4 | ARRAY ACCESS OUT OF BOUNDS | LOAD-LOAD |
| 5 | STEAL:7:8 | LOST ITEMS | LOAD-STORE |
| 6 | EXPAND:9:10 | STEAL () RETURNS PHANTOM ITEM | STORE-STORE |

FIG. 3A

```
        R1 = R2 = X = Y = 0;
        A:                  B:
A1:     STORE 1, X    ||   B1: LOAD Y, R1
A2:     STORE 1, Y         B2: LOAD X, R2
```

| RELAXATION | W → R ORDER | W → W ORDER | R → RW ORDER | R OTHERS' W EARLY | R OWN W EARLY |
|---|---|---|---|---|---|
| SC |  |  |  |  | ✓ |
| IBM 370 | ✓ |  |  |  |  |
| TSO | ✓ |  |  |  | ✓ |
| PSO | ✓ | ✓ |  |  | ✓ |
| ALPHA | ✓ | ✓ | ✓ |  | ✓ |
| RMO | ✓ | ✓ | ✓ |  | ✓ |
| POWER PC | ✓ | ✓ | ✓ | ✓ | ✓ |

| LOAD X, R | LOAD THE VALUE OF SHARED X INTO LOCAL R |
|---|---|
| STORE R, X | STORE THE VALUE OF LOCAL R INTO SHARED X |
| CAS X, R, S, Q | ATOMIC COMPARE-AND-SWAP; IF SHARED X IS EQUAL TO LOCAL R, SET IT TO THE VALUE OF LOCAL S. IF THE OPERATION SUCCEEDS q IS SET TO 1, OTHERWISE 0. |
| BRANCH C, L | BRANCH TO LABEL 1. IF THE CONDITIONAL C (ON THE LOCAL STATE) EVALUATES TO TRUE. |
| LOCALOP E, R | AN OPERATION THAT SET THE VALUE OF LOCAL R TO THE VALUE OF EXPRESSION E (ON LOCAL VARIABLES). |
| FENCE | MEMORY FENCE |

| Algorithm 1: Fence Inference |
|---|
| Input: Program P. Specification S<br>Output: Program P' satisfying S |
| 1    compute $<\Sigma_P, T_P>$ |
| 2    *avoid(Init)* ← *false* |
| 3    foreach state $\sigma \in \Sigma_P \setminus \{Init\}$ do |
| 4      *avoid*($\sigma$) ← *true* |
| 5    workset ← $\Sigma_P \mid \{Init\}$ |
| 6    while *workset is not empty* do |
| 7      $\sigma$ ← select and remove state from workset |
| 8      $\varphi$ ← *avoid*($\sigma$) |
| 9      foreach *transition* $t = (\mu \rightarrow \sigma) \in T_P$ do |
| 10        $\varphi$ ← $\varphi \wedge (avoid(\mu) \vee prevent(t))$ |
| 11      if *avoid*($\sigma$) $\not\equiv \varphi$ then |
| 12        *avoid*($\sigma$) ← $\varphi$ |
| 13        add all successors fo $\sigma$ in $\Sigma_P$ to workset |
| 14    $\psi$ ← $\wedge \{avoid(\sigma) \mid \sigma \neq S\}$ |
| 15    return implement(P, $\psi$) | und
SYNTHESIS OF MEMORY BARRIERS

FIELD OF THE INVENTION

The present invention relates generally to techniques for placing memory fences in a concurrent program running on a relaxed memory model, and more particularly, to methods and apparatus for automatic inference of memory fences in concurrent programs.

BACKGROUND OF THE INVENTION

Modern architectures typically use relaxed memory models in which memory operations may be reordered and executed non-atomically. While these models allow improved hardware performance, they pose an additional burden on the programmer, who is forced to reason about non-sequentially consistent program executions. To allow programmer control over these relaxed executions, processors provide special memory fence instructions.

As multicore processors become increasingly dominant, highly concurrent algorithms emerge as critical components of many existing systems. Highly-concurrent algorithms are often hard to get right and often rely on subtle ordering of events, an ordering that may be violated under relaxed memory models.

Finding a correct and efficient placement of memory fences for a concurrent program is a challenging task. Using too many fences (over-fencing) hinders performance, while using too few fences (under-fencing) permits executions that violate correctness. Manually balancing between over- and under-fencing is very difficult, time-consuming and error-prone as it requires reasoning about non-sequentially consistent executions. Furthermore, the process of finding fences has to be repeated whenever the algorithm changes, and whenever it is ported to a different architecture.

A need therefore exists for a framework for automatic inference of memory fences in concurrent programs. A further need exists for methods and apparatus for generating a set of ordering constraints that guarantee the correctness of a given program under a given memory model, given the program, a specification and a description of the memory model.

SUMMARY OF THE INVENTION

Generally, aspects of the present invention provide a framework for automatic inference of memory fences in concurrent programs. Methods and apparatus are provided for generating a set of ordering constraints that substantially guarantee the correctness of a given program under a given memory model, given the program, a specification and a description of the memory model.

According to one aspect of the invention, a method is provided for generating a set of ordering constraints that prevent executions of a program violating a specification. One or more incoming avoidable transitions are identified for a state and one or more ordering constraints are refined for the state. The set of ordering constraints are generated by taking a conjunction of ordering constraints for all states that violate the specification.

Generally, incoming avoidable transitions comprise a transition taken by the program that could have been prohibited by a fence. One or more fence locations can optionally be selected based on the generated set of ordering constraints.

A more complete understanding of the present invention, as well as further features and advantages of the present invention, will be obtained by reference to the following detailed description and drawings.

BRIEF DESCRIPTION OF THE DRAWINGS

FIG. 1 illustrates an exemplary implementation of the Chase-Lev algorithm using C-like pseudo-code;

FIG. 2 is a table illustrating possible reorderings under the Relaxed Memory Order (RMO). model (when no fences are used) that lead to violation of the specification;

FIG. 3a illustrates an exemplary program and FIG. 3b illustrates a portion of the transition system built for the program of FIG. 3a running on a specific memory model;

FIG. 4 illustrates an exemplary categorization of relaxed memory models;

FIG. 5 illustrates exempla statements in an exemplary programming language;

FIG. 6 illustrates exemplary pseudo-code for an ordering constraint inference process incorporating features of the present invention;

DETAILED DESCRIPTION OF PREFERRED EMBODIMENTS

Figure 3B:
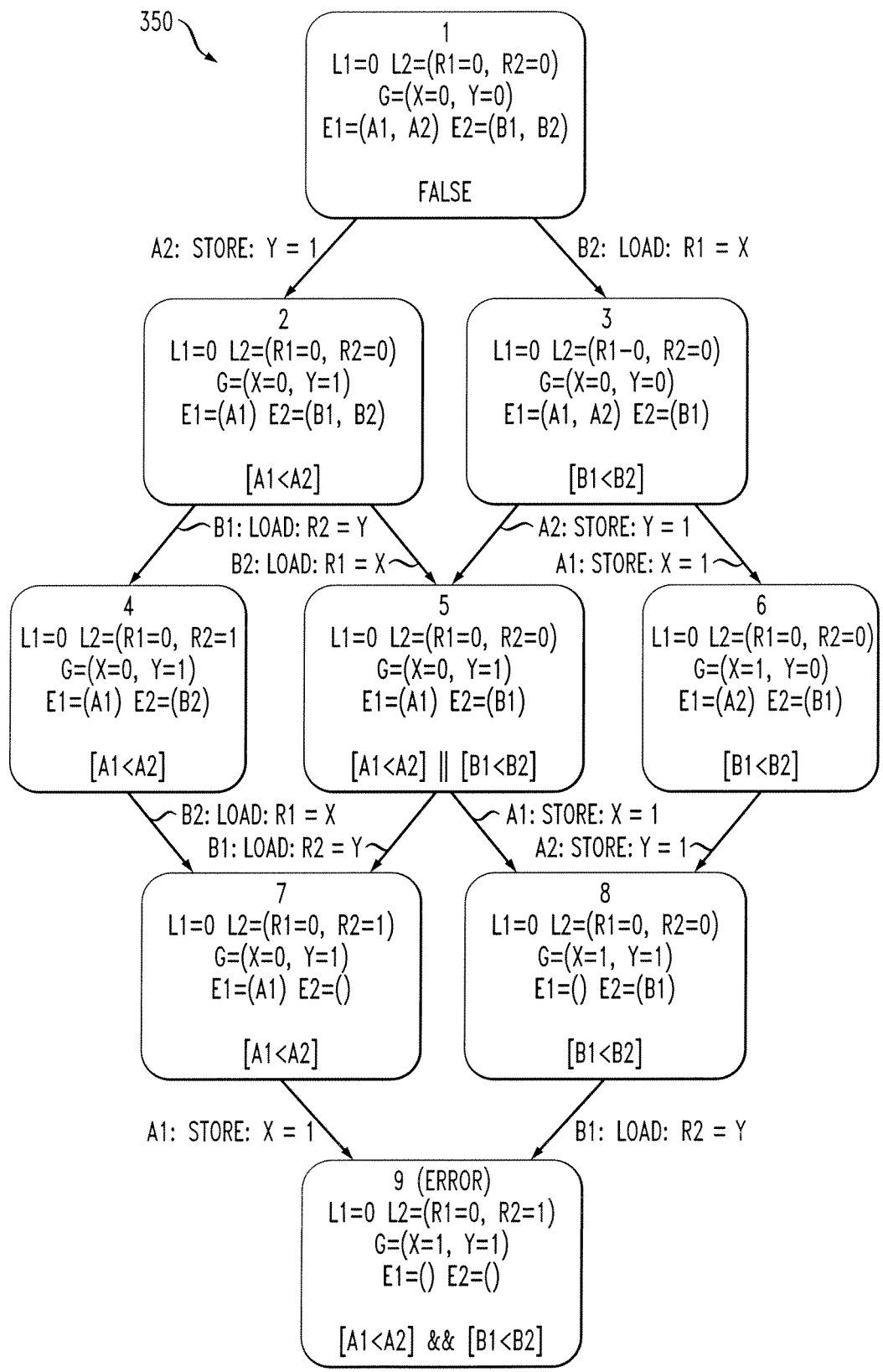

The present invention provides tools synthesizing memory barriers automatically, relieving the programmer from the need to insert barriers manually. According to one aspect of the present invention, the disclosed tool automatically infers substantially correct and efficient placement of memory fences in concurrent programs. According to another aspect of the invention, an inference algorithm is defined in a way that makes the dependencies on the underlying memory model explicit. Thus, the disclosed algorithm can be used with various memory models.

Motivating Example

Consider the problem of implementing the Chase-Lev work-stealing queue on a relaxed memory model. Work stealing is a popular mechanism for efficient load-balancing used in runtimes for languages such as Java, Cilk and X10. FIG. 1 illustrates an exemplary implementation of the Chase-Lev algorithm 100 using C-like pseudo-code.

The algorithm 100 maintains an expandable array of items called wsq and two indices top and bottom that can wrap around the array. The queue has a single owner thread that can only invoke the operations push( ) and take( ) which operate on one end of the queue, while other threads call steal( ) to take items out from the opposite end. For simplicity, it is assumed that items in the array are integers and that memory is collected by a garbage collector (it is noted that manual memory management presents orthogonal challenges).

For this algorithm 100, it is desired to guarantee that there are no out of bounds array accesses, no lost items overwritten before being read, and no phantom items that are read after being removed. All these properties are said to hold for the algorithm under a sequentially consistent memory model. However, they may be violated when the algorithm executes on a relaxed memory model.

Consider the problem of running this algorithm 100 under the SPARC RMO memory model. See, e.g., SPARC International, Inc., "C. The SPARC Architecture Manual," (Ver. 9), Prentice-Hall, Inc., 1994. Under this model, explained further below in a section entitled "Memory Models," operations may be executed out of order. FIG. 2 is a table 200 illustrating possible reorderings under the RMO model (when no fences are used) that lead to violation of the specification. The column locations list the two lines in a given method which contain memory operations that might get reordered and lead to a violation of the specification. The next column gives an example of an undesired effect when the operations at the two labels are reordered. There could be other possible effects (e.g., program crashes), but only one is listed in the table 200. The last column shows the type of fence that can be used to prevent the undesirable reordering. Informally, the type describes what kinds of operations have to complete before other type of operations. For example, a store-load fence executed by a processor forces all stores issued by that processor to complete before any new loads by the same processor start.

Failure Scenario

Consider the failure described in line 2 of FIG. 2, which corresponds to a reordering of operations at lines 4 and 5 in the take( ) operation. With this reordering, it is possible to first read from top and then write to bottom. This can lead to several failures, as shown in the following scenario. The scenario involves one process running the operation steal( ) in parallel to another process running a sequence of take( ); push( ); take( ); push( ).

1. Initially the queue has one item with top=0 and bottom=1.
2. A take( ) reads top and then gets preempted.
3. An entire steal( ) executes and correctly returns the item at index 0 and advance top to 1.
4. The take( ) resumes and succeeds, returning the same item as the previous steal( ), setting bottom to 0. Returning the same item multiple times is an error.
5. A full push( ) operation now pushes some item i.
6. A full take( ) executes and returns EMPTY instead of item i.
7. A full push( ) executes and overwrites item i (losing item i).

Avoiding Failures with Manual Insertion of Fences

To guarantee correctness under the RMO model, the programmer can try to manually insert fences that avoid undesirable reorderings.

As an alternative to placing fences based on the programmer's intuition, the programmer can use an existing tool such as CheckFence (see, e.g., S. BURCKHARDT et al., "Check-Fence: Checking Consistency of Concurrent Data Types on Relaxed Memory Models.". 12-21, PLDI (2007)) to check the correctness of a fence placement. If the placement is incorrect, the tool will provide a (non-trivial) counterexample, requiring the programmer to manually examine the result, understand the cause of the error, and attempt to fix it by placing a memory fence at some program location. Repeatedly adding fences to avoid each counterexample can easily lead to over-fencing: a fence used to fix a counterexample may be made redundant by another fence inferred for a later counterexample. In practice, localizing a failure to a single reordering is challenging and time consuming as a failure trace might include multiple reorderings. Furthermore, as shown by the scenario above, a single reordering can exhibit multiple failures, and it is hard to identify the cause underlying an observed failure. Even under the assumption that each failure has been localized to a single reordering (as in FIG. 2), inserting fences still requires considering each of these 6 cases.

In a nutshell, the programmer is required to manually produce FIG. 2: summarize and understand all counterexamples from a checking tool, localize the cause of failure to a single reordering, and propose a fix that eliminates the counterexample. Further, this process might have to be repeated manually every time the algorithm is modified or ported to a new memory model. For example, the fences shown in FIG. 1 are required for the RMO model, but on the SPARC TSO model the algorithm only requires the single fence in take( ). Keeping all of the fences required for RMO is inefficient for TSO, but finding what fences can be dropped requires a complete re-examination.

Inference Algorithm

The disclosed inference algorithm works by taking as input a program, a specification and a description of the memory model, and computing a set of ordering constraints that guarantee the correctness of the program under the memory model. The computed constraints are maximally permissive: removing any constraint from the solution would permit an execution violating the specification.

Applicability of the Inference Algorithm

The disclosed inference algorithm is applicable to any operational memory model on which the notion of an avoidable transition can be defined that can be prevented by a local fence. This requires the ability to identify in a state: (i) that an event happens out of order; and (ii) what alternative events could have been forced to happen instead, using a local (per-processor) fence. Requirement (i) is fairly standard and is available in common operational memory model semantics. Requirement (ii) states that a fence only affects the order in which instructions execute for the given processor but not the execution order of other processors. This holds for models such as RMO, TSO and PSO, but not for PowerPC, where the SYNC instruction has a cumulative effect.

State

Given a memory model and a program, a transition system of the program can be built, i.e. explore all reachable states of the program running on that memory model. A state in such a transition system will typically contain two kinds of information: (i) assignments of values to local and global variables; (ii) per-process execution buffer containing a set of events that will eventually occur (for instance memory events or instructions waiting to be executed), where the order in which they will occur has not yet been determined.

Computing Avoid Formulae

Given a transition system and a specification, the goal of the inference algorithm is to compute fences that prevent execution of all traces leading to states that violate the specification (error states). One naive approach is to enumerate all (acyclic) traces leading to error states, and try to prevent each by adding appropriate fences. However, such enumeration does not scale to any practical program, as the number of traces is exponential in the size of the transition system which is itself potentially exponential in the program length. Instead, the exemplary algorithm works on individual states and computes for each state an avoid formula that captures all the ways to prevent execution from reaching the state. Using the concept of an avoidable transition mentioned earlier, the condition under which a state is avoidable can be defined. The avoid formula for a state σ considers all the ways to avoid all incoming transitions to σ by either: (i) avoiding the transition itself; or (ii) avoiding the source state of the transition.

Since the transition system may contain cycles, the computation of avoid formulae for states in the transition system needs to be iterated to a fixed point.

Example

Consider an exemplary program 300 shown in FIG. 3a. For this program 300, it is desired to guarantee that R1≥R2 in its final state. For illustrative purposes, consider a simple memory model where the stores to global memory are atomic and the only allowed relaxation is reordering data independent instructions. The exemplary system supports more relaxed memory models as discussed below.

FIG. 3b shows part of the transition system 350 built for the program running on this specific memory model. Only states that can lead to an error state are shown in FIG. 3b. States in FIG. 3b are numbered for convenience. As shown in FIG. 3b, each state contains: (i) assignments to local variables of each process (L1 and L2), and the global variables G; (ii) the execution buffer of each process (E1 and E2); and (iii) an avoid formula, discussed below.

The initial state (state 1) has R1=R2=X=Y=0. There is a single error state where R1=0 and R2=1 (state 13).

The avoid formula for each state is computed as mentioned earlier. For example, the avoid formula in state 2 is computed by taking the disjunction of avoiding the transition A2 and avoiding the source state of the transition (state 1). To check whether A2 is an avoidable transition from state 1, check whether A2 is executed out of order, and what are the alternative instructions that could have been executed by A instead. The execution buffer E1 is examined and all instructions that precede A2 are found. A2 is executed out of order, and A1 could have been executed to avoid this transition. The constraint A1<A2 is generated as a way to avoid the transition A2. The meaning of this constraint is that the transition can be avoided if A1 is executed before A2. Since the source state (state 1) cannot be avoided, the avoid formula for state 2 is just A1<A2. The constraint B1<B2 for state 4 is obtained similarly.

For state 6, there are two incoming transitions: B2 and A2. Here, B2 is taken out of order from state 2 and hence the constraint B1<B2 is generated. The constraint for the parent state 2 is A1<A2, so the overall constraint becomes B1<B2 $\Rightarrow$ V A1<A2. Similarly, the constraint is computed for transition A2 which generates an identical constraint. The transition from state 6 to state 15 is taken in order. Therefore, the transition itself cannot be avoided and the only way to avoid reaching 15 is by the avoid formula of its predecessor, state 6. For the error state 13, the two incoming transitions do not generate constraints as they are executed in-order, but the overall constraint is generated as conjunction of the constraints of the predecessor states 11 and 12.

Since this transition system is acyclic, fixed point is reached with a single pass of the algorithm, and the resulting overall constraint is the avoid constraint of the error state: A1<A2^B1<B2. This constraint is implemented by introducing a store-store fence between A1 and A2 and a load-load fence between B1 and B2.

Memory Models

To demonstrate the exemplary fence inference algorithm on realistic memory models, a relaxed memory model RLX is defined and implemented that contains key features of modern memory models. FIG. 4 illustrates an exemplary categorization 400 of relaxed memory models. According to the summary 400 contained in FIG. 4, there are five such key features, but precludes "reading other's writes early" and speculative execution of load instructions.

Barring speculative execution of loads, RLX corresponds to Sun SPARC v9 RMO and is weaker than the SPARC v9 TSO and PSO models. RLX is strictly weaker than the IBM 370. Since RLX is weaker than these models, any fences that are inferred for correctness under RLX are going to guarantee correctness under these models.

The disclosed framework can instantiate models stronger than RLX, by disabling some of the relaxations in RLX. In fact, the framework supports any memory model that can be expressed using a bypass table (similar to Y. YANG et al., "Umm: An Operational Memory Model Specification Framework With Integrated Model Checking Capability," Concurr. Comput.: Pract. Exper. 17, 5-6, 465-487 (2005), and the "instruction reordering table" of X. Shen et al., "Commit-Reconcile & Fences (CRF): A New Memory Model for Architects and Compiler Writers," SIGARCH Comput. Archit. News 27, 2, 150-161 (1999)). This enables an experiment with fence inference while varying the relaxations in the underlying memory model. It has been found that different models lead the different fence placements in practical concurrent algorithms, demonstrating the importance of automatic inference.

Preliminaries

Programming Language

The present invention is illustrated using a simple (but expressive) programming language 500, shown in FIG. 5. FIG. 5 illustrates exemplary statements 500 in the programming language. A multiprogram M is defined as $\{Init_M; Var_M; Prog_i; Start_i\}$ i=1, ..., k, where:

$Var_M$=Shared$\cup$Local is the set of shared and local variables;

$Init_M$ is the initial state;

$Prog_{M,i}$ is the program code of process i; and $Start_{M,i}$ is the initial statement for each process.

M is omitted when it is clear from context. It is assumed that all statements are uniquely labeled, and thus a label uniquely identifies a statement in the program. Given a label l, stmt(l) and proc(l) denote the statement and process identifier corresponding to l, respectively. The set of all program labels is denoted by Labs.

A transition system for a multi-program P is a tuple $\langle \Sigma_P, T_P \rangle$, where $\Sigma_P$ is a set of states, $T_P$ is a set of labeled transitions $$\sigma \xrightarrow{l} \sigma^l.$$

A transition is in $T_P$ if $\sigma, \sigma^l \in \Sigma_P$ and l$\in$Labs, such that executing the statement stmt(l) (where l$\in$enabled ($\sigma$)) from $\sigma$ by proc(l) results in state $\sigma^l$. lbl(t) denotes the unique label of the transition t. src(t) and dst(t) denote the source and target states of transition t, respectively. The map enabled: $\Sigma_P \rightarrow$P(Labs) is specific to the memory model.

An (infinite) trace $\pi$ is a sequence of transitions $\pi_0, \pi_1, \ldots$ where dst($\pi_{j-1}$)=src($\pi_j$), for j>0. A trace for P is valid if and only if all transitions in the trace $\in T_P$, and src($\pi_0$)=$Init_M$.

Dynamic Program Order

Typically, memory models semantics are based on the concept of program order, which is known a priori. This is indeed the case for loop-free or statically unrolled programs. For programs that contain loops, X. Shen et al., "Commit-Reconcile & Fences (CRF): A New Memory Model for Architects and Compiler Writers," SIGARCH Comput. Archit. News 27, 2, 150-161 (1999)) shows that such an order is not well defined, unless a memory model is also provided. Furthermore, for some memory models the program order may depend on the specific execution.

To accommodate programs with loops, a dynamic program order is defined. This order captures the program order at any point in the execution. For a given a state $\sigma$ and a process p, $l_1 <_{\sigma,p} l_2$ when $l_1$ precedes $l_2$ in the dynamic program order. The intended meaning is that in-order execution from state $\sigma$ would execute the statement at $l_1$ before executing the statement at $l_2$.

Inference Algorithm

An Algorithm for Inferring Ordering Constraints

Figure 7:
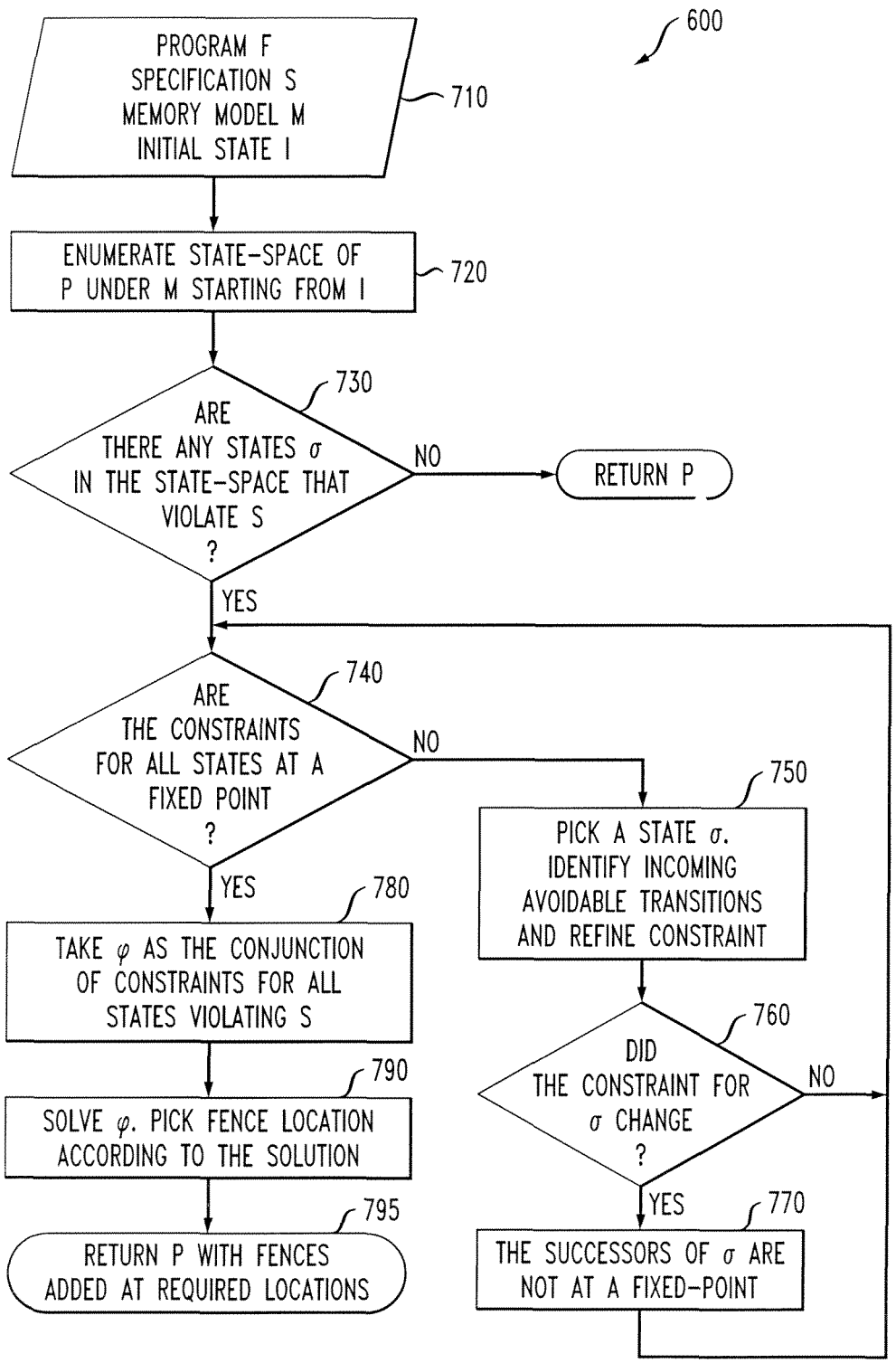
FIG. 7 is a flow chart describing an exemplary implementation of the ordering constraint inference process of FIG. 6.

FIG. 6 illustrates exemplary pseudo-code for an ordering constraint inference process 600. Likewise, FIG. 7 is a flow chart describing an exemplary implementation of the ordering constraint inference process 600.

Given a program P and a specification S, the exemplary ordering constraint inference process 600 infers a set of ordering constraints that prevent all program executions violating S and can be implemented by fences.

Avoidable Transitions and Ordering Constraints

The computed ordering constraints are based on the concept of an avoidable transition—a transition taken by the program that could have been prohibited by a fence. This captures the intuition of a transition that was taken out of order. To identify such transitions, a dynamic program order is used: a transition $$t = \sigma \xrightarrow{l_t} \sigma^t$$

is avoidable if there exists some $l_1$ such that $l_1 <_{\sigma,p} l_t$.

An ordering predicate $(l_1 \prec l_2)$ is defined with the intended meaning that the predicate holds for a transition t when the transition follows the in-order execution of $l_1$ and $l_2$:

$$\sigma \xrightarrow{l_t} \sigma^t \Big| \neq (l_1 \prec l_2) \text{ if and only if } l_t = l_2 \wedge l_1 <_{\sigma,p} l_t.$$

An ordering constraint is a propositional formula over ordering predicates. Checking satisfaction for a transition on such formulas corresponds to standard propositional satisfaction. Given a trace π, π satisfies an ordering constraint φ when every transition in π satisfies φ.

As noted above, it is desired to avoid enumerating counterexample traces. Thus, an algorithm is defined that operates on states. For every state σ in the program's transition system, the ordering constraint inference process 600 computes an ordering constraint avoid(σ) such that if the constraint is satisfied, it prevents execution from reaching the state σ. The computed constraints avoid(σ) capture possible ways to prevent execution from reaching σ by forbidding avoidable transitions.

The exemplary ordering constraint inference process 600 computes a fixed point of avoid constraints for all states in the program's transition system. The exemplary ordering constraint inference process 600 starts by building the transition system $\langle \Sigma_P, T_P \rangle$ of the program. The exemplary ordering constraint inference process 600 initializes avoid(σ) to false (line 2), as initially, it is not known whether a state can be avoided. The exemplary ordering constraint inference process 600 then adds all of the states to the workset, leaving out the Init$_M$ states, as execution cannot be prevented from reaching the initial state.

The ordering constraint inference process 600 proceeds by picking a state from the workset, and computing the avoid constraint for the state. A state can only be avoided by avoiding all incoming transitions (a conjunction). To avoid a transition, (i) consider all possible ways to avoid the transition from the predecessor state (line 10, prevent(t)); or (ii) avoid the predecessor state, by using its own avoid constraint (line 10).

Finally, when a fixed point has been reached, the ordering constraint inference process 600 computes the overall constraint ψ by taking the conjunction of avoid constraints for all the states that violate the specification (line 14). Any implementation satisfying ψ is guaranteed to avoid all error states, and thus satisfy the specification. To find a program that satisfies ψ, the exemplary ordering constraint inference process 600 calls the procedure implement(P, ψ) on line 15, which returns a program that satisfies ψ, and hence is guaranteed to satisfy the original specification.

FIG. 7 is a flow chart describing an exemplary implementation of the ordering constraint inference process 600. Generally, the exemplary ordering constraint inference process 600 infers a set of ordering constraints that prevent all program executions violating S and can be implemented by fences. As shown in FIG. 7, the ordering constraint inference process 600 initially is given, during step 710, a program P, a specification S, a memory model M and an initial state I.

Thereafter, during step 720, the ordering constraint inference process 600 enumerates the state-space of the program P under the memory model M, starting from initial state I. During step 730, the exemplary ordering constraint inference process 600 performs a test is performed to determine if there are any states σ in the state-space that violate the specification S. If it is determined during step 730 that there are no states σ in the state-space that violate the specification S, then the program P is returned.

If, however, it is determined during step 730 that there are states σ in the state-space that violate the specification S, then a further test is performed during step 740 to determine if there are constraints for all states at a fixed point. If it is determined during step 740 that there are constraints for all states at a fixed point, then ψ is taken during step 780 as the conjunction of constraints for all states violating the specification S. During step 790, the ordering constraint inference process 600 solves ψ and picks the fence locations according to the solution. The ordering constraint inference process 600 then returns the program P during step 795 with the memory fences added at the appropriate locations.

If, however, it was determined during step 740 that there are constraints for all states at a fixed point, then the ordering constraint inference process 600 picks a state σ during step 750, identifies incoming avoidable transitions and refines the constraint. A further test is performed during step 760 to determine if the constraint for state σ has changed. If it is determined during step 760 that the constraint for state σ has not changed, then program control returns to step 740 and continues in the manner discussed above.

If, however, it is determined during step 760 that the constraint for state σ has changed, then it is determined during step 770 that the successors of state σ are not at a fixed-point.

Ensuring Termination

In cases where the transition system is an acyclic graph (e.g. transition systems for loop-free programs), if the states are topologically sorted, the fixed point computation can be completed with a single linear pass over the transition system. Thus, for acyclic graphs, prior to computing constraints the exemplary implementation performs topological sorting on the graph.

If the transition system contains cycles, then the fixed point for computing the constraints is guaranteed to terminate because the number of ordering predicates is finite, and for any given state σ it can be shown that for two successive avoid constraints $\phi_1$ and $\phi_2$, $\phi_1 \Rightarrow \phi_2$. (More formally, the set of ordering constraints forms a finite lattice with implication, and the sequence of avoid formulas assigned to each state is an ascending chain.)

Maximal Permissiveness

Given a program P and a specification S, the avoid formula computed by Algorithm 1 is the maximally permissive avoid formula such that all traces of P satisfying φ are guaranteed to satisfy S. More formally, for any weaker formula φ' such that φ⇒φ', there exists an execution π of P such that π=φ' and π≠S.

Algorithm Optimizations

The exemplary ordering constraint inference process 600 (Algorithm 1) is written in a mix of operational and declarative style. The exemplary implementation of the algorithm uses several optimizations to scale to realistic algorithms. Next, those that are important to implementing the algorithm efficiently in a tool are described herein.

Formula Equivalence

Each step of the exemplary ordering constraint inference process 600 requires determining the equivalence of two boolean formulas (Line 11). Although in general this is NP-hard, in practice two successive avoid constraints usually have a very similar structure and equivalence is easy to check. To conserve this structure, at each step the formula is brought to CNF form and some basic simplification is performed.

Sharing Constraints Between Operations

For programs that have the form of a client that invokes operations of a data-structure, the same constraints should apply to different invocations of a data structure operation. This is because fences are implemented in the data-structure operation, and not in the client. This structure is exploited by associating every statement in $Prog_i$ not just with a label, but also with an ID, where IDs may not be unique across processes or even within the same process. The relation $<_{o,i}$ and the constraints are then defined not over the labels but over the IDs of statements. For example, if in a push( ) operation on a stack there is a STORE followed by a LOAD, the store can have the ID $i_1$ and the load the ID $i_2$. Then, the constraint $(i_1 \prec i_2)$ is interpreted to mean the store must be executed before the load (under the usual dynamic program order rules) in every invocation of the push( ).

State Pruning

When there is no path in the transition system from a state σ to an error state, that state is not added to the workset. This is because avoid(σ) will never be propagated to any error states, and thus will not affect the final result.

Fence Inference

As previously indicated, the exemplary ordering constraint inference process 600 computes a maximally permissive constraint formula. Once the avoidance formula $\psi = \wedge \{avoid(\sigma) | \sigma \neq S\}$ is computed, it can be treated as a propositional formula where ordering predicates are interpreted as variables. This allows a standard SAT-solver to be used to get assignments for ψ, where each assignment represents a set of constraints that enforces correctness. Since for any set of constraints C, a superset C' cannot be more efficiently implemented, only minimal (in the set-containment sense) sets have to be considered.

An orthogonal problem is to define criteria that would allow us to select optimal fences that enforce one of those sets. Generally, there are many such possible definitions, depending, for instance, on whether different types of fences have different costs. A simple natural definition using set containment of fences is assumed. That is, a fence placement is a set of program labels where fences are placed. A placement $P_1$ is better than $P_2$ when $P1 \subseteq P2$.

Given a minimal assignment C for the formula ψ, for each predicate $(l_1 \prec l_2)$, a fence can be inserted either right after $l_1$ or right before $l_2$, thus getting a correct placement of fences. This can be tried for all minimal assignments of ψ, and only the minimal fence placements are selected. The above procedure can be improved by defining a formula ε such that every predicate in ψ is replaced with $after(l_1) \Rightarrow before(l_2)$. Here, after(l) and before(l) map labels to boolean variables, so that if $l_2$ appears immediately after $l_1$ in the program, then after $(l_1)$=before$(l_2)$. Then, the fence placements will be the minimal assignments to ε. This allows a SAT-solver to be directly applied to get the minimal fence placements.

Theoretically, this local approach will not guarantee the minimality of fences (even when the assignments C to the formula are minimal). This is because there can be many ways to implement a constraint $(l_1 \prec l_2)$ aside from inserting a fence immediately after $l_1$ or before $l_2$. For instance, if $l_1, \ldots l_4$ appear in this order in the program, and $\psi = (l_1 \prec l_4)^\wedge(l_2 \prec l_3)$ then a single fence can be implemented between $l_2$ and $l_3$.

Another alternative to the local fence placement is to use the program's control flow graph (CFG). Given the program's CFG, it can be shown that a constraint $(l_1 \prec l_2)$ can be implemented by any placement of fences such that there is a fence on every path in the control-flow graph between $l_1$ and $l_2$. The problem of finding such a minimal implementation can be thought of as an instance of a generalization of the NP-hard minimal multicut problem on the control-flow graph, where each constraint maps to a pair of terminals. Note that this problem would be an instance of min-multicut if ψ were simply a conjunction of constraints. While the result is always at least as good as the local algorithm, it is easy to show it is still not minimal in the sense of set containment.

The exemplary tool implements the local inference algorithm using a SAT solver. While the fence placement computed by the local algorithm is not guaranteed to be minimal in general, it has been found to produce minimal placements of fences. In other words, removing any fence would render the algorithm incorrect.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 8:
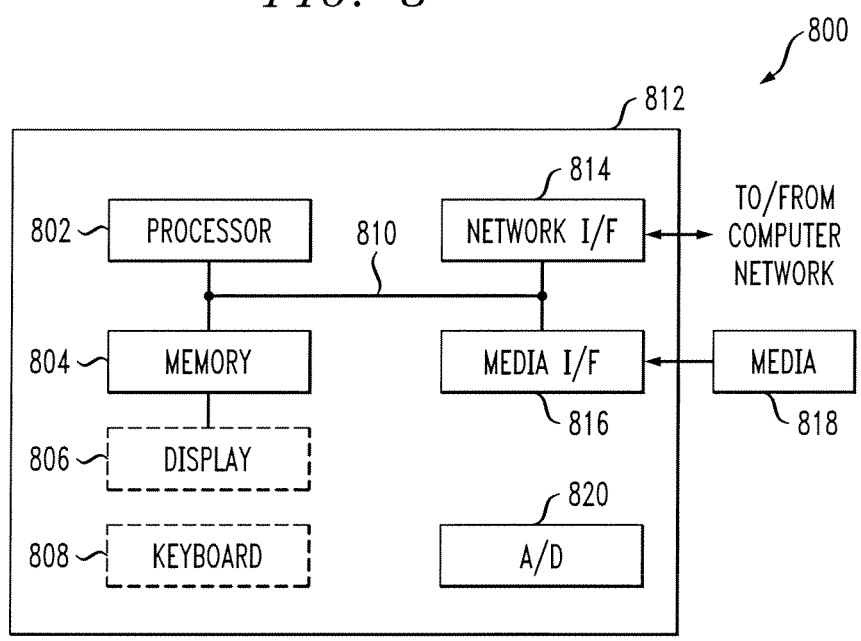
FIG. 8 depicts a computer system that may be useful in implementing one or more aspects and/or elements of the present invention.

One or more embodiments can make use of software running on a general purpose computer or workstation. FIG. 8 depicts a computer system 800 that may be useful in implementing one or more aspects and/or elements of the present invention. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Analog-to-digital converter(s) 820 may be provided to receive analog input, such as analog video feed, and to digitize same. Such converter(s) may be interconnected with system bus 810.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 818 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 802. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for generating a set of ordering constraints that prevent executions of a program P violating a specification, said method comprising:

identifying one or more incoming avoidable transitions for a state, wherein said one or more incoming avoidable transitions comprise a transition taken by the program that can be prohibited by a fence, wherein a given transition from a first state $\sigma^1_t$ to a second state $\sigma^1$ is avoidable if there exists a label $l_1$ identifying a statement in said program P such that said label $l_1 <_{\sigma,p} l_t$, where a state $\sigma$ executes a statement at said label $l_1$ before executing a statement at a label $l_2$;

refining one or more ordering constraints for said state; and generating said set of ordering constraints by taking a logical conjunction of ordering constraints for all states that violate said specification.

2. The method of claim 1, further comprising the step of generating a state-space of said program from an initial state.

3. The method of claim 2, further comprising the step of determining if there are additional states to process in said state-space.

4. The method of claim 3, wherein said step of determining if there are additional states to process in said state-space comprises determining whether one or more constraints for said state changed.

5. The method of claim 1, further comprising the step of selecting one or more fence locations based on said generated set of ordering constraints.

6. A system for generating a set of ordering constraints that prevent executions of a program violating a specification, said system comprising:

a memory; and at least one processor, coupled to the memory, operative to:

identify one or more incoming avoidable transitions for a state, wherein said one or more incoming avoidable transitions comprise a transition taken by the program that can be prohibited by a fence, wherein a given transition from a first state $\sigma^1_t$ to a second state $\sigma^1$ is avoidable if there exists a label $l_1$ identifying a statement in said program P such that said label $l_1 <_{\sigma,p} l_t$, where a state $\sigma$ executes a statement at said label $l_1$ before executing a statement at a label $l_2$;

refine one or more ordering constraints for said state; and generate said set of ordering constraints by taking a logical conjunction of ordering constraints for all states that violate said specification.

7. The system of claim 6, wherein said processor is further configured to generate a state-space of said program from an initial state.

8. The system of claim 7, wherein said processor is further configured to determine if there are additional states to process in said state-space.

9. The system of claim 8, wherein said wherein said processor is further configured to determines if there are additional states to process in said state-space by determining whether one or more constraints for said state changed.

10. The system of claim 6, further comprising the step of selecting one or more fence locations based on said generated set of ordering constraints.

11. An article of manufacture for generating a set of ordering constraints that prevent executions of a program violating a specification, comprising a non-transitory machine readable recordable storage medium containing one or more programs which when executed implement the steps of:

identifying one or more incoming avoidable transitions for a state, wherein said one or more incoming avoidable transitions comprise a transition taken by the program that can be prohibited by a fence, wherein a given transition from a first state $\sigma^1_t$ to a second state $\sigma^1$ is avoidable if there exists a label $l_1$ identifying a statement in said program P such that said label $l_1 <_{o,p} l_t$, where a state $\sigma$ executes a statement at said label $l_1$ before executing a statement at a label $l_2$;

refining one or more ordering constraints for said state; and generating said set of ordering constraints by taking a logical conjunction of ordering constraints for all states that violate said specification.

12. The article of manufacture of claim 11, further comprising the step of generating a state-space of said program from an initial state.

13. The article of manufacture of claim 12, further comprising the step of determining if there are additional states to process in said state-space.

14. The article of manufacture of claim 13, wherein said step of determining if there are additional states to process in said state-space comprises determining whether one or more constraints for said state changed.

* * * * *